US 8,045,627 B2

(12) United States Patent
Clausen et al.

(10) Patent No.: US 8,045,627 B2
(45) Date of Patent: Oct. 25, 2011

(54) METHOD FOR REDUCING THE CREST FACTOR

(75) Inventors: Axel Clausen, München (DE); Werner Henkel, Achim (DE); Dietmar Sträußnigg, Villach (AT); Steffen Trautmann, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 1441 days.

(21) Appl. No.: 10/559,697

(22) PCT Filed: Jun. 3, 2004

(86) PCT No.: PCT/EP2004/006003
§ 371 (c)(1), (2), (4) Date: Aug. 26, 2006

(87) PCT Pub. No.: WO2004/110010
PCT Pub. Date: Dec. 16, 2004

(65) Prior Publication Data
US 2007/0121736 A1    May 31, 2007

(30) Foreign Application Priority Data
Jun. 6, 2003  (DE) .................................. 103 25 836

(51) Int. Cl.
*H04K 1/10*    (2006.01)
(52) U.S. Cl. ......... 375/260; 375/285; 375/296; 370/210
(58) Field of Classification Search .................. 375/260, 375/285, 296; 370/210
See application file for complete search history.

(56) References Cited

U.S. PATENT DOCUMENTS

| | | | |
|---|---|---|---|
| 6,175,551 B1 | 1/2001 | Awater et al. | |
| 6,529,925 B1 | 3/2003 | Schenk | |
| 2002/0159532 A1 | 10/2002 | Wight | |
| 2002/0196863 A1 | 12/2002 | Kaku et al. | |
| 2003/0026263 A1* | 2/2003 | Taunton | 370/395.1 |
| 2003/0043895 A1 | 3/2003 | Melsa | |

FOREIGN PATENT DOCUMENTS

| | | |
|---|---|---|
| DE | 198 38 295 A1 | 6/1999 |
| DE | 198 50 642 A1 | 5/2000 |
| EP | 0 725 510 A1 | 8/1996 |
| WO | WO 03/026240 A2 | 3/2003 |

OTHER PUBLICATIONS

Henkel et al., "PAR Reduction Revisited: An Extension to Tellado's Method," International OFDM-Workshop, Sep. 17, 2001, pp. 1-6, (6 pages).

* cited by examiner

*Primary Examiner* — Shuwang Liu
*Assistant Examiner* — Michael Neff
(74) *Attorney, Agent, or Firm* — SpryIP, LLC

(57) ABSTRACT

The invention relates to a method for reducing the crest factor of a data symbol to be transmitted in a multi-carrier data transmission system, in which the data symbol to be transmitted is a function of a multiplicity of signals provided within a predetermined data frame and each of these signals is allocated to a carrier, each carrier occupying in each case at least one frequency from a transmit data spectrum, at least one carrier being reserved which is not provided for the data transmission and the predetermined data frame exhibiting the data symbol and a prefix which is derived from a part of the data symbol, in which peak values within the prefix are also taken into consideration for reducing the crest factor.

12 Claims, 7 Drawing Sheets

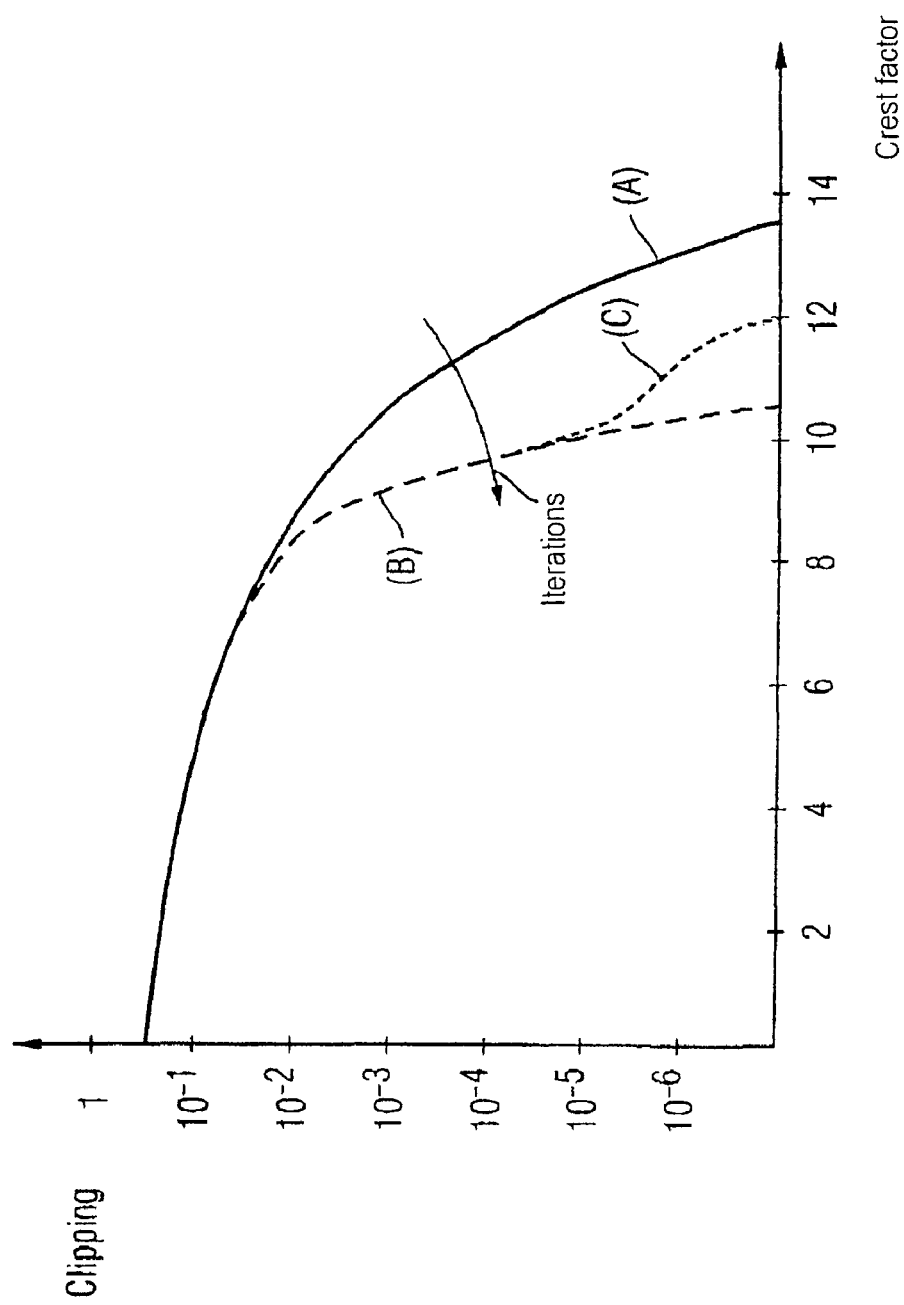

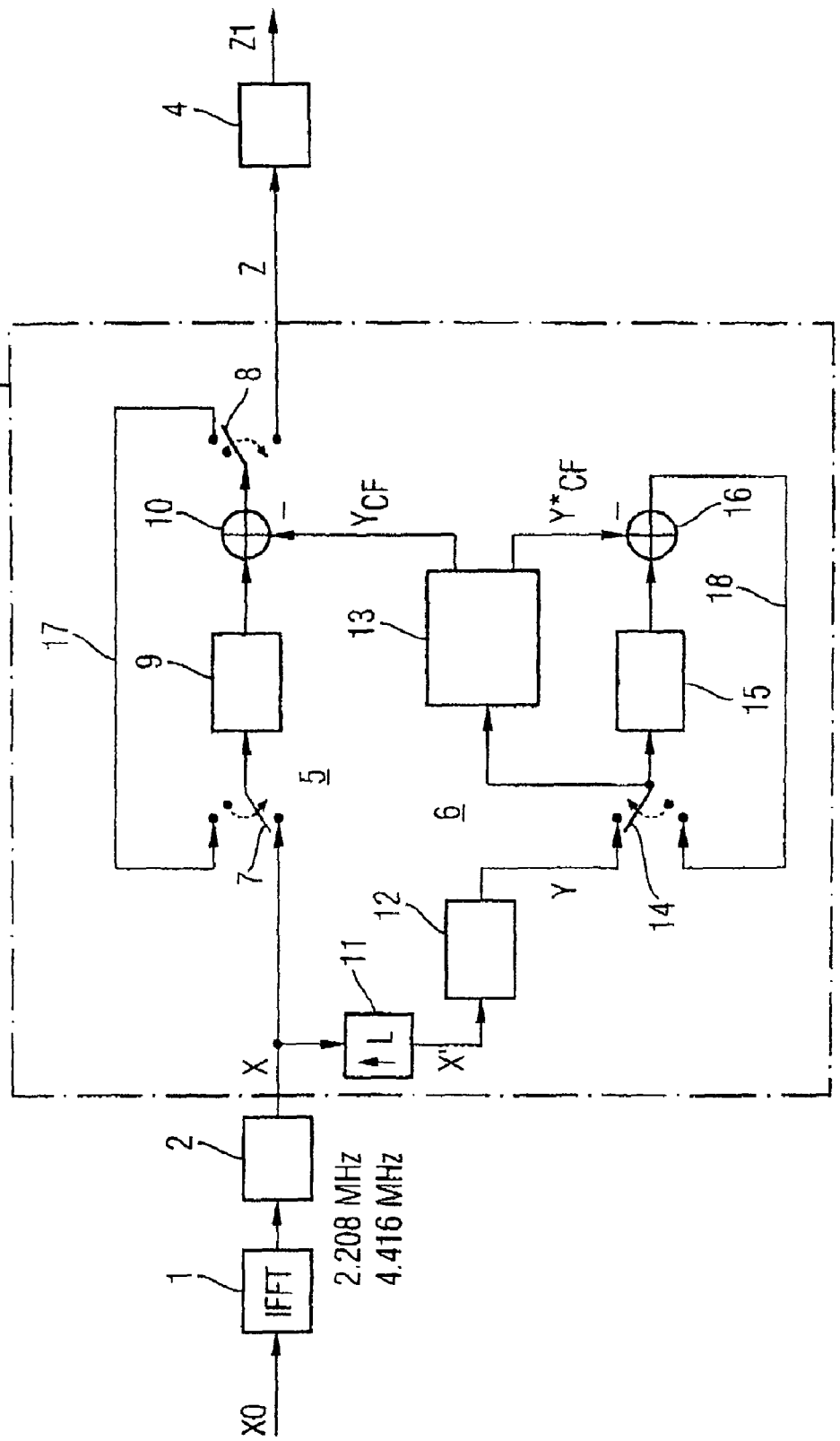

k=450
k'=386

METHOD FOR REDUCING THE CREST FACTOR

The invention relates to a method for reducing the crest factor of a data symbol to be transmitted in a multi-carrier data transmission system, in which the data symbol to be transmitted is a function of a multiplicity of signals provided within a predetermined data frame and each of these signals is allocated to a carrier, each carrier occupying in each case at least one frequency from a transmit data spectrum, at least one carrier being reserved which is not provided for the data transmission.

In modern telecommunication, high-bit-rate data transmission on a subscriber line plays an increasingly great role, particularly because it promises greater usable bandwidth of the data to be transmitted, in combination with bidirectional data communication.

A technology increasingly gaining in importance in recent times is the so-called multi-carrier data transmission, also known as "discrete multitone (DMT)" transmission or as "orthogonal frequency division multiplexing (OFDM)" transmission. Such data transmission is used, for example, in line-connected systems but also in the radio domain for broadcast systems and for access to data networks. Such systems for transmitting data with multi-carrier transmission use a multiplicity of carrier frequencies, the data stream to be transmitted being split for the data transmission into many parallel part-streams which are transmitted independently of one another in frequency-division multiplex. These part-streams are also called single carriers.

One representative of multi-carrier data transmission is the ADSL technology, ADSL standing for "asymmetric digital subscriber line". ADSL designates a technology which allows the transmission of a high-bit-rate bit stream from a central station to the subscriber and of a low-bit-rate bit stream leading from the subscriber to a central station. In this technology, the telecommunication line is subdivided into at least one channel for conventional telephone services (that is to say voice transmission) and at least one further channel for data transmission.

Even though very many problems are solved with such multi-carrier data transmission systems such as ADSL, some problems still remain unresolved.

One problem associated with this multi-carrier data transmission results from the fact that due to the superposition of a great number of single carriers, these can briefly add up to very high peak values in the transmit signal. The ratio of peak value to RMS value is called crest factor and its square is called PAR (peak to average ratio). The crest factor can become very large—for example larger than 6—especially in the case of multi-carrier systems such as ADSL. Even if these peak values are very rare in the resultant amplitude and typically only exist for very short periods of time, they represent a great disadvantage of multi-carrier data transmission.

A large crest factor causes various problems in the overall system of data transmission:

The modulation range and the dynamic range and resolution of the maximum possible modulation of the digital/analog converters and of the analog circuit components such as filters and line drivers must be designed for the maximum peak values occurring. This means that these circuit components must have much larger dimensions than the RMS modulation. This is associated with a correspondingly high operating voltage which also leads directly to a high power dissipation. This leads to distortion of the signal to be transmitted, particularly in the case of line drivers which generally exhibit a not negligible nonlinearity.

A further problem of data transmission with high crest factors consists in it being possible for a very high peak value in the transmit signal to exceed the maximum possible modulation. In this case, clipping of the transmit signal occurs. In these cases, however, the transmit signal no longer represents the original transmit signal sequence so that transmission errors occur.

For this reason, the need exists in such multi-carrier data transmission systems to largely suppress or avoid such peak values. In the literature, this problem is known by the term crest factor reduction or also PAR reduction. There are number of approaches to solutions for reducing the crest factor:

In one known method, some carriers or carrier frequencies from the multi-carrier data transmission system are reserved (typically about 5% of the spectrum). From these reserved carriers, a time domain function with the highest possible, temporally narrow peak value is generated which forms the correction signal or, respectively, what is known as the kernel. This kernel, which only occupies the reserved carriers, is iteratively weighted with an amplitude factor which is proportional to the difference of the maximum peak value and the desired maximum value and is subtracted from the transmit signal in the time domain. During this process, the kernel is cyclically displaced to the point of the corresponding peak value of the transmit signal which is responsible for the excessive crest factor. The displacement law of the DFT transformation ensures that only the reserved carriers are occupied even after the displacement.

In international patent application WO 03/026240 A2, a method based on the method described above is described in which peak values in the time signal to be transmitted, which are responsible for too high a crest factor, are reduced by iterative calculation of the correction signal. During this process, oversampling of the input signal and modeling of the filters following the circuit for crest factor reduction takes place in order to ensure by this means optimum crest factor reduction and thus high quality data transmission.

The methods described above are based on the existence, manipulation and iterative application of correction signals in the time domain—the so-called kernels. These methods only operate in the time domain and are, therefore, characterized by their speed and low complexity.

For multi-carrier data transmission, the real, time-and value-discrete (digital) signal to be transmitted is composed of individual frames with a predetermined time duration. Each frame contains a fixed number of part-signals which are the result of an inverse Fourier transform and to a certain extent contain the transmit data which are to be transmitted, for example, via a telephone line. These transmit data within a frame which are distributed over individual carrier frequencies form the data symbol, the ADSL symbol in the case of ADSL. The last values of each respective data symbol are additionally inserted within the frame in each case before the data symbol to be transmitted. These values form a so-called cyclic prefix of a data symbol to be transmitted which, in the case of ADSL, is predetermined by the standard.

Since this cyclic prefix is a replica of a part of the data symbol, it can also contain peak values. It is usually sufficient for reducing the crest factor to detect peak values in the area of the data symbol, without taking into consideration the cyclic prefix. In this case, it is assumed that a peak value in the area of the cyclic prefix also exhibits a corresponding peak in the actual data symbol.

FIG. 1 shows a characteristic with and without crest factor reduction. The continuous line (A) here designates the characteristic without crest factor reduction and the dashed line designates an ideal characteristic (B) for the case where crest factor reduction is performed. However, it has been found that this ideal characteristic can be achieved at the least with great difficulty or not at all, particularly if a multiplicity of iterations are provided for reducing the crest factor. Instead, the currently used methods for reducing the crest factor produce a characteristic (C) which corresponds to the dotted line. This dotted characteristic (C) increasingly deviates from the ideal characteristic (B) for very small clipping probabilities. The problem in this case is that this results in an impairment of the performance of the method particularly for small clipping probabilities.

The present invention is, therefore, based on the object of providing a more effective method for reducing the crest factor.

According to the invention, this object is achieved by a method having the features of claim 1.

It is normally sufficient only to detect peak values in the area of the transmit symbol, that is to say not in the area of the cyclic prefix, for reducing the crest factor, since it may be assumed that a peak value in the area of the cyclic prefix also necessitates a corresponding peak in the actual data frame. The present invention is then based on the finding that with this procedure, boundary effects, that is to say transient processes, are neglected in reducing the crest factor. Neglecting additional peak values caused by these transient processes within the cyclic prefix which are the result of the sequential convolution of successive data symbols with the filters or filter chains following the circuit for reducing the crest factor, ultimately leads to a deterioration of the performance of the crest factor reduction. This becomes noticeable particularly due to the fact that the characteristic (B) for the crest factor deviates from the ideal characteristic (C) with increasing iterations during the crest factor reduction for small clipping probabilities or small clipping rates (see FIG. 1).

The concept forming the basis of the present invention is then based on the fact that peak values in the area of the cyclic prefix are also taken into consideration for crest factor reduction or for peak value detection. Although this creates the risk that due to the reduction of a peak value caused by boundary effects, an artificial peak is generated in the corresponding area of the data symbol. However, it has been found that compared with a method in which the cyclic prefix is not taken into consideration during the peak value search, taking the cyclic prefix into consideration is much more effective and thus qualitatively improved.

It has been found that the cause of the deterioration of the method is transient processes (boundary effects) which always play a greater or lesser role in the symbol-oriented data transmission over temporally dispersive channels or filters and, therefore, must also be taken into consideration. The transient processes relevant to reducing the crest factor are a function of the impulse response of the downstream filter or filter chain. Thus, the data symbol to be transmitted on the transmit path exhibits transient processes after the filtering.

By including according to the invention the cyclic prefix in the search for the peak value, the effects of these transient processes can be reduced to a minimum during the crest factor reduction. Using the method according to the invention, it is thus possible to achieve a crest factor characteristic which approximately corresponds to the ideal characteristic (B) in FIG. 1.

Advantageous embodiments and further developments of the invention can be found in the subclaims and in the description, referring to the drawing.

In the text which follows, the invention will be explained in greater detail by means of the exemplary embodiments specified in the diagrammatic figures of the drawing, in which:

FIG. 1 shows the crest factor characteristic in the case of a data transmission with and without crest factor reduction;

FIG. 2 shows a block diagram of a circuit for crest factor reduction of a multi-carrier transmission system;

In all the figures of the drawing, identical or functionally identical elements, signals and functions have been designated identically unless otherwise specified.

FIG. 2 shows the block diagram of a circuit for reducing the crest factor— called CF circuit in the text which follows— of a multi-carrier transmission system. In FIG. 2, only a section of the transmission path 5 at the transmitter end is shown which is arranged between a transmitter, not shown, and a hybrid circuit, also not shown, which is connected to the corresponding telephone line.

Figure 3A:
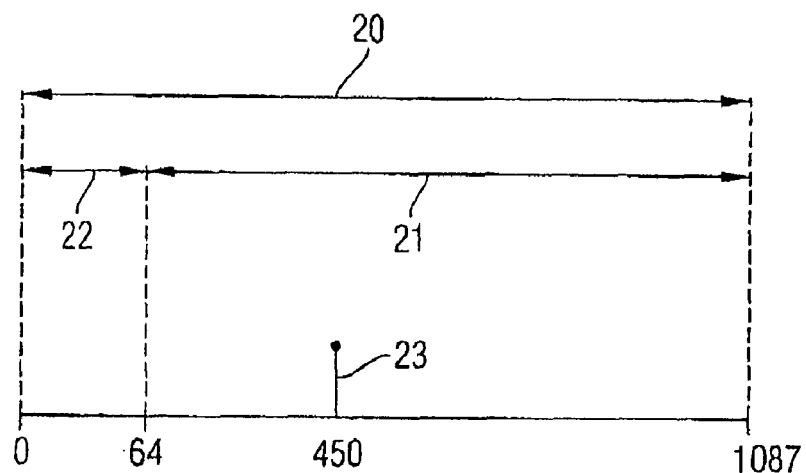
FIG. 3 shows a first example for representing the method according to the invention.

On the transmit path 5 of multi-carrier data transmission system, an IFFT module 1, a prefix unit 2, a CF circuit 3 and an output filter 4 are arranged in succession. The IFFT module 1 is supplied by the transmitter with an input signal X0 which is modulated by the IFFT module 1 by means of an inverse Fourier transform. The input signal X thus modulated, which has a sampling frequency of 2.208 MHz in the case of an ADSL data transmission, and a sampling frequency of 4.416 MHz in the case of an ADSL+data transmission, is supplied to a downstream prefix unit 2. The prefix unit 2 provides each data symbol from the IFFT-transformed data signal X0 to be transmitted with a cyclic prefix. The input signal X modulated and provided with the cyclic prefixes which is generated in this way is supplied to the downstream CF circuit 3. The CF circuit 3 generates a crest-factor-reduced output signal Z which is supplied to the downstream output filter 4 (or the filter chain). After the filtering of the crest-factor-reduced output signal Z, the filter 4 outputs a signal Z1 which is still present with a reduced crest factor.

For this purpose, the CF circuit 3 has a model path 6 which is arranged in parallel with a section of the transmit path 5. The model path 6 branches away from the transmit path 5 at the input of the CF circuit 3 so that the model path 6 is also supplied with the modulated input signal X provided with the prefix. At the beginning of the model path 6, an oversampling block 11 is provided which oversamples the original time-domain signal X, formed by the user data, L-fold, for example 4-fold or 2-fold.

The L-fold oversampled signal X' is supplied to a downstream model filter 12. The model filter 12 is as accurate as possible a replica of the filter 4 or filter chain following the CF circuit 3. This takes into account the characteristic of filter 4 and its influence on the signal X to be transmitted. This ensures that, although the output signal Z has been changed by the output filter 4 and thus the possibility of a new generation of an excessive crest factor exists, the filtered output signal Z1 nevertheless does not have any excessive peak values.

The model filter 12 is followed by a computing unit 13 which searches for the corresponding peak values from the oversampled and filtered signal Y and determines their positions within the frame. The computing unit 13 is advantageously formed as a program-controlled unit, particularly as a microprocessor or microcontroller. In the case of a peak value, the computing unit 13 generates a correction signal $Y_{CF}$, to be precise in each case a correction signal $Y_{CF}$ for the signal path 5 and a correction signal $Y^*_{CF}$ for the oversampled model path 6. The correction signals $Y_{CF}$, $Y^*_{CF}$ are suitably scaled and displaced in accordance with the amplitude and position of the peak values. These correction signals $Y_{CF}$, $Y^*_{CF}$ are formed, for example, from dirac-like sample functions which, for example, are stored in a memory (not shown in FIG. 2). This memory can be implemented in the computing unit 13 or can also be separately constructed.

The correction signal $Y_{CF}$ is supplied to the adding device 10. In the adding device 10, the transmit signal X of the transmit path 5, suitably delayed in time, is superimposed on the correction signal $Y_{CF}$. The superposition is effected, for example, by subtracting the correction signal $Y_{CF}$ from the corresponding part of the time-domain signal X. The signal Y, suitably delayed in time, is superimposed on the oversampled correction signal $Y^*_{CF}$ in the adding device 16 of the model path 6.

The feedback path 17, 18 on the transmit path 5 and model path 6 and the corresponding switches 7, 8, 14 are used for the iterative treatment of the respective signals. The transmit path 5 shows the iterative change in the time domain function X, which is not oversampled, whilst the model path 6 performs the associated modification in the oversampled timing pattern of the signal Y.

For the iterative treatment of the input signals X, the transmit path 5 contains a first switch 7 (start), a second switch 8 (stop), and a buffer 9 and addition device 10 arranged between these switches 7, 8. The buffer device 9 is used for buffering, i.e. delaying the time-domain signal X supplied at the input, in order to take into account a time delay on the model path 6, and for storing the respective intermediate values per iteration.

For the iterative treatment of the oversampled signals Y on the model path 6, a first switch 14 (start), a buffer device 15 and an adding device 16 are provided. This is because the computing unit 13 also supplies the correction signal $Y^*_{CF}$ to the adding device 16 in which the correction signal $Y^*_{CF}$ is subtracted from the time-domain signal Y on the model path. This results in a second iteration loop.

With regard to the general configuration and the operation of a multi-carrier data transmission system 1, shown in section in FIG. 2, and particularly of a CF circuit 3, reference is made to WO 03/026240 A2, already mentioned initially, which is included with its full content in the present patent application with respect to the configuration of a multi-carrier data transmission system and particularly a circuit for crest factor reduction.

Figure 3B:
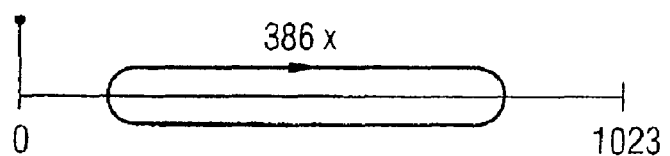
Figure 3C:
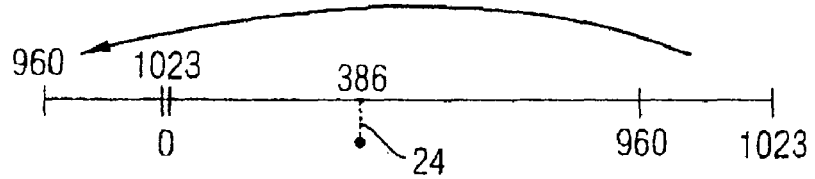
Figure 3D:
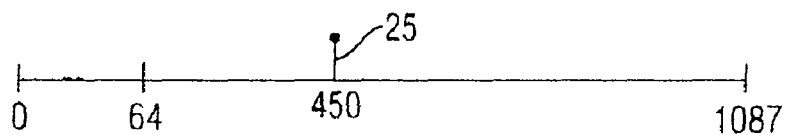
Figure 4A:
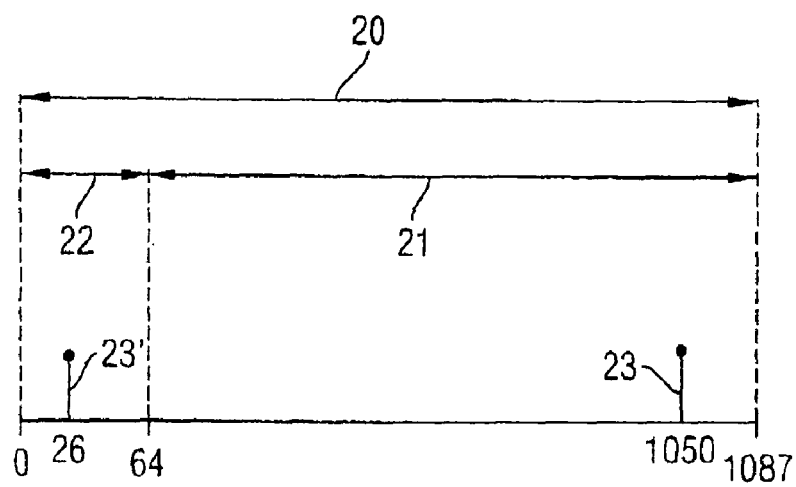
FIG. 4 shows a second example for representing the method according to the invention.
Figure 4B:
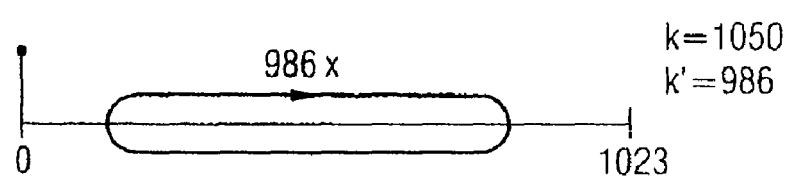
Figure 4C:
Figure 4D:
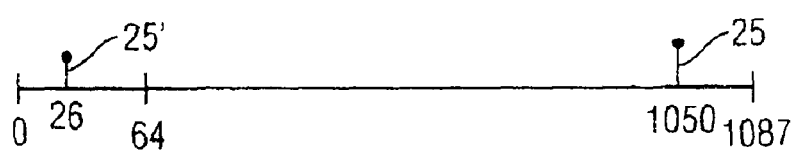
Figure 5A:
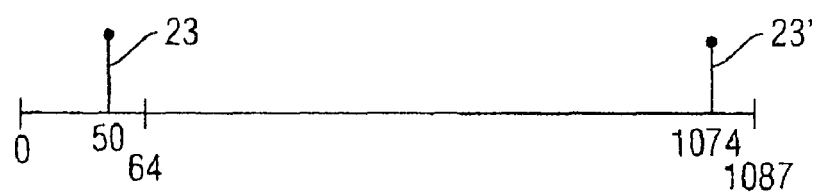
FIG. 5 shows a third example for representing the method according to the invention.
Figure 5B:
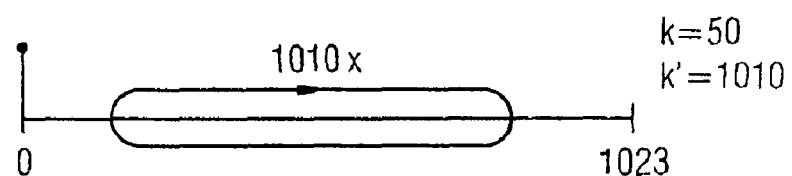
Figure 5C:
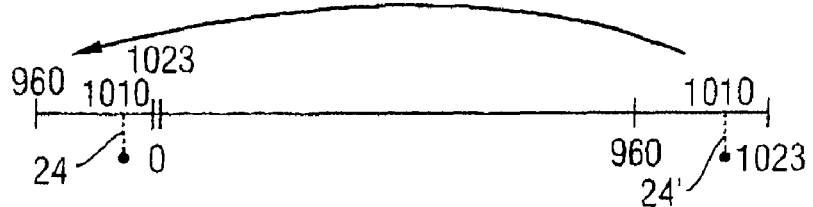
Figure 5D:
Figure 6A:
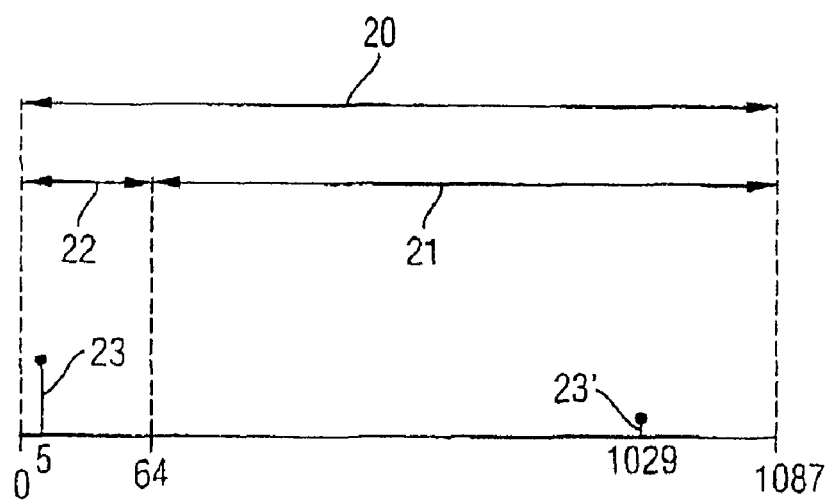
FIG. 6 shows a fourth example for representing the method according to the invention.
Figure 6B:
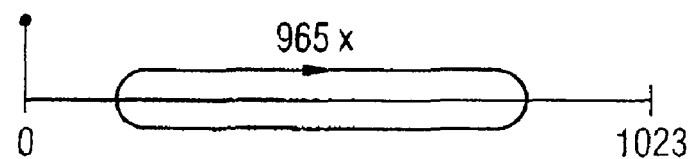
Figure 6C:
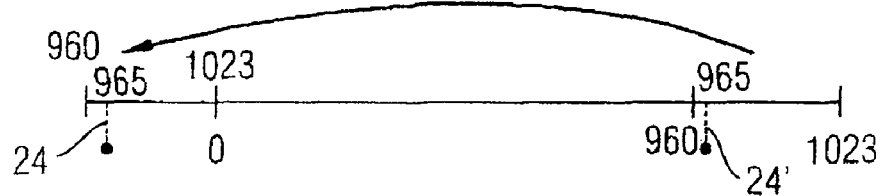
Figure 6D:
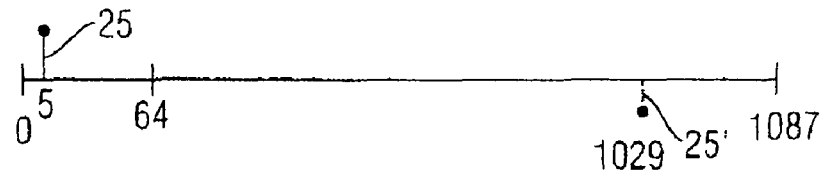
Figure 7A:
FIG. 7 shows a fifth example for representing the method according to the invention.
Figure 7B:
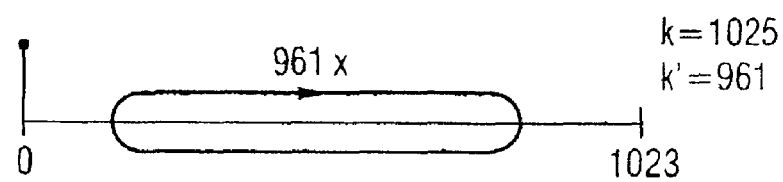
Figure 7C:
Figure 7D:

In the text which follows, the method according to the invention for reducing the crest factor by including the cyclic prefix will be explained in greater detail with reference to FIGS. 3 to 7.

In FIGS. 3-7, the reference symbols 20 designate a corresponding frame for the data transmission. The data symbol to be transmitted within this frame is designated by reference symbol 21. Preceding each data symbol 21, a cyclic prefix 22 is also provided. In the five exemplary embodiments according to FIGS. 3-7, in each case one peak value 23 per frame 20 is provided which in each case exists at a different position within the frame 20. To reduce this peak value 23, a correction signal 24 is generated from a sample correction function, the so-called kernel, according to the invention. After superimposing the correction signal 24 on the data symbol to be transmitted, particularly after superimposing this correction signal 24 on the peak value 23, a crest-factor-reduced peak value 25 is obtained.

For the sake of simplicity, a data transmission according to the ADSL+ standard is assumed, that is to say, there is no oversampling either for the model path 6 or for the transmit path 5. The same constellation would exist in ADSL with 2-fold oversampling. It shall also be assumed that the number of peak value corrections per iteration is limited to one. It shall be assumed that the complete frame 20 has 1088 samples, of which 1024 samples are intended for the data symbol 21 to be transmitted and 64 samples are intended for the cyclic prefix 22.

In FIGS. 3-7, k designates the position of a peak value 23 or, respectively, of a sample referring to the entire frame 20, whereas k' designates the relative position of this peak value 23 referring to the data symbol 20, that is to say minus the cyclic prefix 22, and thus the cyclic displacement of the correction signal 24 to be performed.

In the exemplary embodiment of FIG. 3, the peak value 23 is arranged approximately in the center of the frame 20 and of the corresponding data symbol 21. In this case, k=450 and k'=386.

In the case of FIG. 4, the detected peak value 23 exists at the end (k=1050) of data frame 20 or, respectively, of the data symbol 21. At the same time, a corresponding, slightly smaller peak value 23' exists within the cyclic prefix 22 at position k=26. The cyclic displacement k' is here 986.

In the case of FIG. 5, the detected peak value is located position k=50 in the area of the cyclic prefix 22. At the same time, there is a corresponding, slightly smaller peak value 23' at the end of frame 20 at position k=1074. The cyclic displacement is here k'=1010.

In the case of FIG. 6, the detected peak value 23 exists immediately at the start of the cyclic prefix 22 with k=5. This peak value 23 is the result of transient processes. At the corresponding position in the data symbol 21, there is, therefore, no corresponding peak value. The displacement of the kernel here is k'=965.

In the exemplary embodiment of FIG. 7, the detected peak value 23 at position k=1025 is at a position of the data symbol 21 which corresponds to a position k=1 at the start of the cyclic prefix 22. However, there is no corresponding peak value at position k=1 of the cyclic prefix 22 due to transient processes or boundary effects. The displacement of the kernel is k'=961.

The method according to the invention can then be described by the following method steps, taking into consideration FIGS. 3-7 by way of example for ADSL+:
1. Firstly, the position of a peak value 23 is determined for each data frame 20. During this process, the complete data frame 20 filtered in the model filter 12 of the model path 6, that is to say both the IFFT-transformed data symbol and the cyclic prefix 22 preceding this data symbol 21 (see part-figures (a)) is taken into consideration for the peak value search.
2. Performance of a modulo operation in order to determine the required displacements of the dirac-like signal (kernel):

$$k'=\mod(k-64,1024) \rightarrow k'=0\ldots 1023$$

3. Displacement and suitable scaling of the kernel 24 (correction signal) on the model path (see part-figures (b)).
4. Displacement and suitable scaling of the corresponding kernel for the update on the signal path (not shown in FIGS. 3-7).

5. Cyclic expansion of the transposed scaled kernel in order to generate the correction signal 24, 24' for the model path (see part-figures (c)).
6. Cyclic expansion of the corresponding transposed scaled kernel in order to generate the correction signal for the update on the signal path.
7. Addition of the corresponding correction signal 24, 24' to the data symbols, particularly the peak values 23, 23' on the model path (see part-figures (d)) and, respectively, on the signal path, for forming a crest-factor-reduced peak value 25, 25'.

Although the present invention has been described above by means of preferred exemplary embodiments, it is not restricted to these but can be modified in many ways.

In particular, the invention is not restricted to the above data transmission systems and methods but can be expanded, for the purpose of crest factor reduction, to all systems and methods based on multi-carrier data transmission. In particular, the invention shall not be restricted to ADSL data transmission but can be expanded to all xDSL data transmission systems. Mobile applications such as DAB (digital audio broadcast) or DVB-T (digital video broadcasting-terrestrial) or OFDM-based WLAN (wireless local area network) applications are also conceivable.

In FIGS. 3-7, the cyclic prefix is in each case arranged at the beginning of a frame. However, this prefix can also be arranged additionally or alternatively at the end or at any position within a frame. In principle, instead or a cyclic prefix, any other redundancy which does not necessarily have to be cyclic, either, can be used. For example, the corresponding carriers can also be occupied by zeros in this case.

In addition, the invention shall not necessarily be restricted to 2-fold or 4-fold oversampling of the data signal to be transmitted. Instead, it can also be provided that no oversampling, or even subsampling or oversampling of any degree takes place.

In particular, the invention shall not be restricted to the above numerical information but can be arbitrarily modified within the framework of the invention and of expert knowledge.

Naturally, the elements of the circuit for reducing the crest factor and the specified IFFT modules and filters are conventional hardware components but can also be implemented in software.

Instead of an IFFT transformation, any other transformations suitable for multi-carrier transmission can also be used.

| List of reference designations | |
|---|---|
| 1 | IFFT module |
| 2 | Prefix unit |
| 3 | Circuit for reducing the crest factor, CF circuit |
| 4 | Output filter, filter chain |
| 5 | Transmit path |
| 6 | Model path |
| 7 | Switch |
| 8 | Switch |
| 9 | Buffer device, memory |
| 10 | Adding device |
| 11 | Block for oversampling |
| 12 | Model filter |
| 13 | Computing unit |
| 14 | Switch |
| 15 | Buffer device, memory |
| 16 | Adding device |
| 17 | Iteration path |
| 18 | Iteration path |

| List of reference designations (continued) | |
|---|---|
| 20 | Predetermined (ADSL) frame |
| 21 | Data symbol to be transmitted |
| 22 | Cyclic prefix |
| 23, 23' | Peak values |
| 24' 24' | Dirac-like correction signal, kernel |
| 25, 25' | Crest-factor-reduced peak values |
| X0 | Input signal |
| X | (IFFT-modulated) input signal |
| X' | (Oversampled modulated) input signal |
| Y | Filtered signal |
| $Y_{CF}$ | Correction signal for the signal path |
| $Y^*_{CF}$ | Oversampled correction signal for the model path |
| Z | Output signal |
| Z1 | Filtered output signal |

The invention claimed is:

1. A method for reducing a crest factor of a data symbol to be transmitted in a multi-carrier data transmission system, the data symbol being a function of a plurality of signals provided within a predetermined data frame, each of the plurality of signals allocated to a carrier, each carrier occupying at least one frequency from a transmit data spectrum, at least one carrier being reserved which is not provided for the data transmission, the method comprising:

receiving the predetermined data frame, the predetermined data frame exhibiting the data symbol and a cyclic prefix which is derived from a part of the data symbol; and performing crest factor reduction corresponding to the predetermined data frame based at least in part on peak values within the cyclic prefix of the predetermined data frame, by:

(a) filtering the data symbol and the cyclic prefix;
(b) determining whether a time-domain function of the data symbol and of the cyclic prefix within the predetermined data frame exhibits at least one peak value that exceeds a first threshold;
(c) determining an amplitude of an exhibited peak value and an associated position within the predetermined data frame;
(d) generating a correction function by scaling and transposing a sample correction function in dependence on the amplitude and associated position of the exhibited peak value;
(e) using the at least one carrier which is not available for data transmission for generating the sample correction function in the time-domain; and
(f) modifying the data symbol to be transmitted by superimposing the correction function.

2. The method as claimed in claim 1, further comprising repeating steps (b)-(e) until at least one of the following conditions has occurred: the data symbol no longer exhibits any peak values above the first threshold or a predetermined number of iteration steps has been reached.

3. The method as claimed in claim 1, further comprising:
repeating steps (a)-(e) until at least one of the following conditions has occurred: the data symbol no longer exhibits any peak values above the first threshold or a predetermined number of iteration steps has been reached,
wherein the data symbol modified by the correction function is used for the filtering in step (a).

4. The method as claimed in claim 1, further comprising oversampling at least the data symbol prior to step (b).

5. The method as claimed in claim 1, wherein step (d) comprises using a dirac-like function as the sample correction function.

6. A method for reducing a crest factor of a data symbol to be transmitted in a multi-carrier data transmission system, the data symbol being a function of a plurality of signals provided within a predetermined data frame, each of the plurality of signals allocated to a carrier, each carrier occupying at least one frequency from a transmit data spectrum, the method comprising:
- (a) receiving the predetermined data frame, the predetermined data frame having the data symbol and a prefix which is derived from a part of the data symbol;
- (b) performing crest factor reduction corresponding to the predetermined data frame by determining an amplitude of an identified peak value and an associated position within the predetermined data frame; and
- (c) generating a correction function by scaling and transposing a sample correction function in dependence on the amplitude and associated position of the identified peak value and using at least one carrier which is not available for data transmission for generating the sample correction function in the time-domain.

7. The method as claimed in claim 6, wherein the step (b) comprises searching for peak values exceeding a first threshold in the data symbol and in the cyclic prefix.

8. The method as claimed in claim 7, wherein the step (b) comprises filtering the data symbol and the cyclic prefix over the predetermined data frame prior to searching for peak values.

9. The method as claimed in claim 8, wherein filtering the data symbol and cyclic prefix comprises using filtering characteristics corresponding to a downstream filter of the multi-carrier data transmission system.

10. The method as claimed in claim 6, wherein step (b) comprises modifying the data symbol to be transmitted by superimposing the correction function.

11. The method as claimed in claim 7, wherein step (b) comprises oversampling at least the data symbol prior to searching for peak values.

12. The method as claimed in claim 6, wherein step (d) comprises using a direct-like function as the sample correction function.

* * * * *